(12) United States Patent
Swayne et al.

(10) Patent No.: US 12,030,555 B2
(45) Date of Patent: Jul. 9, 2024

(54) FUNCTIONALLY OPTIMIZED ADHESIVE BEADS

(71) Applicant: Honda Motor Co., Ltd., Tokyo (JP)

(72) Inventors: Andrew K. Swayne, Dublin, OH (US); Eric J. Boettcher, Columbus, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 972 days.

(21) Appl. No.: 17/018,789

(22) Filed: Sep. 11, 2020

(65) Prior Publication Data

US 2022/0081042 A1    Mar. 17, 2022

(51) Int. Cl.
| | |
|---|---|
| *B62D 27/02* | (2006.01) |
| *B62D 25/06* | (2006.01) |
| *B62D 65/02* | (2006.01) |
| *C09J 5/04* | (2006.01) |
| *C09J 5/06* | (2006.01) |
| *C09J 175/04* | (2006.01) |

(52) U.S. Cl.
CPC ........... *B62D 27/026* (2013.01); *B62D 25/06* (2013.01); *B62D 65/02* (2013.01); *C09J 5/04* (2013.01); *C09J 5/06* (2013.01); *C09J 175/04* (2013.01); *C09J 2203/354* (2020.08); *C09J 2301/50* (2020.08)

(58) Field of Classification Search
CPC ...... B62D 27/026; B62D 25/06; B62D 65/02; C09J 5/04; C09J 5/06; C09J 175/04; C09J 2203/354; C09J 2301/50; C09J 2475/00; C08G 2170/20
See application file for complete search history.

(56) References Cited

U.S. PATENT DOCUMENTS

| | | | |
|---|---|---|---|
| 3,878,010 A * | 4/1975 | Zammit ................. | B62D 65/00 264/516 |
| 6,193,826 B1 | 2/2001 | Starr et al. | |
| 6,470,559 B1 | 10/2002 | Spaulding et al. | |

(Continued)

FOREIGN PATENT DOCUMENTS

| | | | | |
|---|---|---|---|---|
| DE | 19632054 | | 12/1997 | |
| DE | 19632054 C1 * | | 12/1997 | ......... B60R 13/0225 |
| KR | 20110026074 | | 3/2011 | |

OTHER PUBLICATIONS

Malucelli et al. "Polyurethane resin-based adhesives: curing reaction and properties of cured systems" International Journal of Adhesion and Adhesives, 2005, vol. 25, pp. 87-91.

*Primary Examiner* — Daniel H Lee
(74) *Attorney, Agent, or Firm* — RANKIN, HILL & CLARK LLP (57) ABSTRACT

A method of making a roof assembly includes bringing first and second adhesive beads into contact with a roof panel and a roof stiffener to thereby define a chamber. The first adhesive bead forms a continuous perimeter around a first vacuum aperture in the roof stiffener to thereby define a first vacuum chamber. The second adhesive bead defines a second continuous perimeter around a second vacuum aperture in the roof stiffener to thereby define a second vacuum chamber. A vacuum is created in each of the first and second vacuum chambers. An outer periphery of each of the first and second adhesive beads is in direct fluid communication with the surrounding atmosphere through a perimeter opening of the chamber.

20 Claims, 4 Drawing Sheets

(56) References Cited

U.S. PATENT DOCUMENTS

| | | |
|---|---|---|
| 6,495,229 B1 | 12/2002 | Carte et al. |
| 8,636,197 B1 | 1/2014 | Hill et al. |
| 8,864,219 B2 | 10/2014 | Jansen |
| 8,973,809 B2 | 3/2015 | Hill et al. |
| 9,308,804 B2 | 4/2016 | Roeder et al. |
| 9,631,124 B2 | 4/2017 | Hannington |
| 2001/0051245 A1 | 12/2001 | Seifert |
| 2003/0159264 A1 | 8/2003 | McLeod et al. |
| 2003/0168889 A1 | 9/2003 | Comert et al. |
| 2004/0100129 A1 | 5/2004 | Palajac et al. |
| 2007/0024092 A1 | 2/2007 | Zirbs et al. |

\* cited by examiner

FUNCTIONALLY OPTIMIZED ADHESIVE BEADS

BACKGROUND

Figure 1:
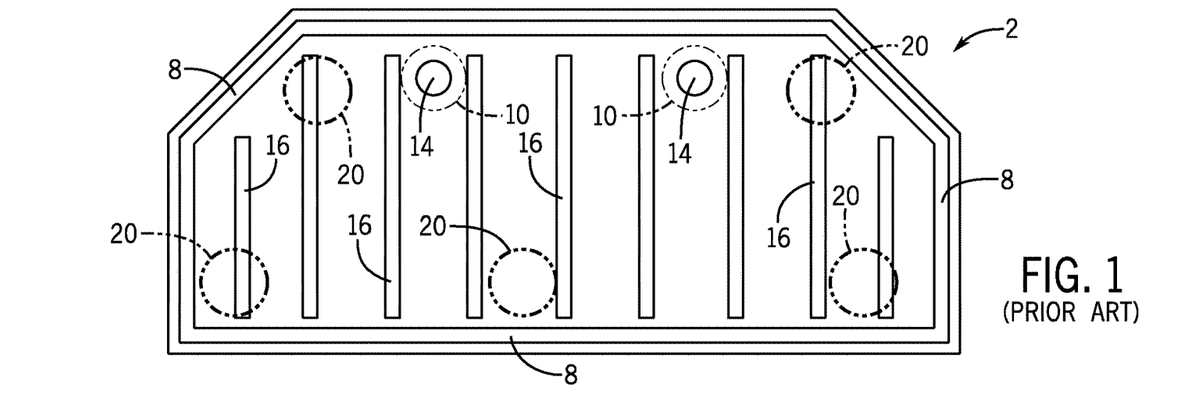
FIG. 1 is a plan view of a prior art reinforcing plate.
Figure 2:
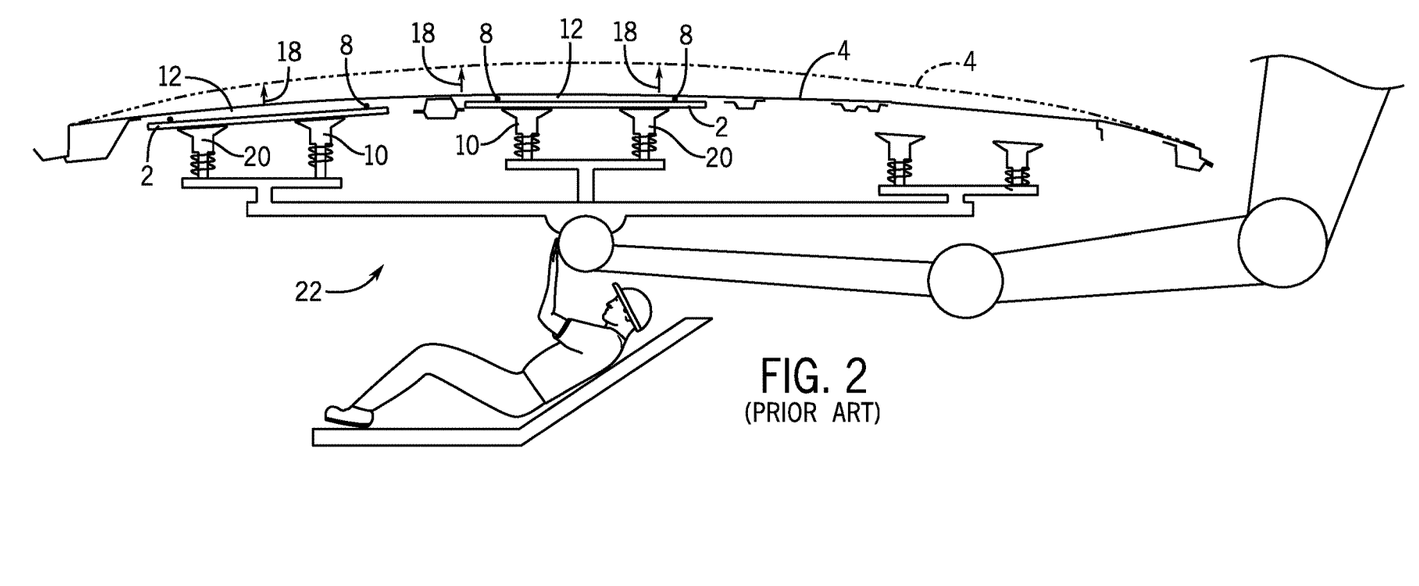
FIG. 2 is a side schematic view of a prior art vehicle roof system and installation method.

A roof reinforcement and damping plate is used to create even stiffness across a vehicle roof surface and to reduce weight by allowing steel support arches, which are conventionally used to reinforce vehicle roofs, to be omitted from the roof structure. With reference to FIGS. 1 and 2, which show prior art reinforced roof systems, the reinforcement and damping plates 2 are adhered to a vehicle roof 4 by using an adhesive. Various patterns of adhesive are used and their adhesion strength can be influenced by cycle time, optimized application, equipment, and performance metrics.

In some existing roof systems, a perimeter bead 8 is arranged between the reinforcement plates 2 and the roof 4, thus defining a volume 12 between the perimeter bead 8, the reinforcement plates 2, and the roof 4. A vacuum cup 10 is sealed over apertures 14 in the reinforcement plates 2 and is used to pull out the air from the volume 12, thus creating a vacuum in the volume 12. The vacuum allows atmospheric pressure to evenly compress the reinforcement plates 2 and the roof 4 together and thereby compresses the adhesive beads 8, 16 to their nominal bead height. Because the reinforcement plates 2 can be quite large, additional interior beads 16 of adhesive are arranged within the perimeter bead 8 to help adhere the reinforcement plates 2 to the roof 4. However, these interior beads are in direct contact with air only through the apertures 14 once the vacuum cup 10 is removed from the aperture 14. Additionally, various adhesives used in such applications are typically moisture cured and therefore require a certain level of humidity to quickly cure and adhere the reinforcement plates 2 to the roof 4. The problem with the known approach is that air does not easily flow back through the open apertures 14 and into the volume 12 once the vacuum cup 10 is removed. Therefore, the moisture curing of the interior beads 16 that are arranged within the continuous perimeter of the perimeter bead 8 is limited by the amount of air flowing to them through the apertures 14, and thus may not receive sufficient airflow and humidity necessary to quickly cure. Because of this, the adhesive in these interior beads 16 can take months to reach full cure and meet required specifications.

The reinforcement plates 2 might also be applied to the roof 4 using a mechanical force, with or without the vacuum. This mechanical force may be applied by hold cups 20 arranged with or without the vacuum cups 10 on an installation rig 22, which pushes the reinforcement plates 2 up toward the roof 4. A compression-only technique may not include the use of the continuous perimeter bead 8. However, such systems cannot apply the vacuum compression method, as the perimeter bead 8 is not provided to form a seal for the vacuum. In compression-only techniques, the mechanical force needed to compress the reinforcement plates 2 against the roof 4 may be more than that needed in a combined compression-vacuum technique, where the vacuum helps compression. In either event, the mechanical force used in a compression-only system or in a compression-vacuum system may cause a certain amount of deflection in the roof 4 as indicated by the arrows 18 and the dotted line depiction of the roof 4 in FIG. 2. Such deflection may be problematic because it may damage the roof 4 or otherwise be undesirable.

BRIEF DESCRIPTION

According to one aspect, a method of applying an adhesive to a vehicle roof includes providing a roof panel including a first side opposite a second side. The method further includes providing a roof stiffener including a first side opposite a second side. The roof stiffener includes at least a first vacuum aperture and a second vacuum aperture each extending through the roof stiffener from the first side of the roof stiffener to the second side of the roof stiffener. The method further includes applying a first adhesive bead to the first side of the roof panel or the first side of the roof stiffener; applying a second adhesive bead to the first side of the roof panel or the first side of the roof stiffener; and positioning the first side of the roof panel facing the first side of the roof stiffener to define a chamber therebetween. The roof stiffener or the roof panel includes an outer perimeter that defines an opening to the chamber. The first adhesive bead and the second adhesive bead contact the roof panel and the roof stiffener. The first adhesive bead defines a first continuous perimeter around the first vacuum aperture. The second adhesive bead defines a second continuous perimeter around the second vacuum aperture. The first adhesive bead incudes an inner periphery and an outer periphery and the second adhesive bead includes an inner periphery and an outer periphery. The outer periphery of the first adhesive bead and the outer periphery of the second adhesive bead are in fluid communication with the opening to the chamber.

According to another aspect, a method of adhering a roof stiffener to a roof panel includes contacting a first adhesive bead to the roof stiffener and to the roof panel to define a first vacuum chamber. The first vacuum chamber is in fluid isolation from a surrounding atmosphere except through a first aperture in the roof stiffener. The method further includes contacting a second adhesive bead to the roof stiffener and to the roof panel to define a second vacuum chamber. The second vacuum chamber is in fluid isolation from the surrounding atmosphere except through a first aperture in the roof stiffener. The method further includes creating a first vacuum in the first vacuum chamber via the first aperture; and creating a second vacuum in the second vacuum chamber via the second aperture.

According to another aspect, a vehicle roof assembly includes a roof panel, a roof stiffener, a first adhesive bead, and a second adhesive bead. The roof panel includes a first side opposite a second side. The roof stiffener includes a first side opposite a second side, and a first vacuum aperture and a second vacuum aperture. Each of the first and second vacuum apertures extend through the roof stiffener from the first side of the roof stiffener to the second side of the roof stiffener. The first side of the roof stiffener faces the first side of the roof panel to define a chamber therebetween. The roof stiffener or the roof panel include an outer perimeter that defines a first opening to the chamber. The first adhesive bead contacts the first side of the roof panel and the first side of the roof stiffener, defines a first continuous perimeter on the first side of the roof stiffener around the first vacuum aperture, includes an outer periphery that is at least partially in fluid communication with the first opening to the chamber, and includes an inner periphery that is in fluid communication with the first vacuum aperture. The second adhesive bead contacts the first side of the roof panel and the first side of the roof stiffener, defines a second continuous perimeter on the first side of the roof stiffener around the second vacuum aperture, includes an outer periphery that is at least partially in fluid communication with the first opening to the chamber, and includes an inner periphery that is in fluid communication with the second aperture.

DETAILED DESCRIPTION

The present invention provides optimized patterns of adhesive beads used to adhere a roof stiffener to a roof panel to produce a roof assembly for a vehicle. The patterns of adhesive account for rapid curing and performance of the adhesive, and can provide a roof assembly that meets performance requirements when delivered to the market. The patterns may use a minimum amount of adhesive needed to meet those performance requirements.

The methods provided include applying a moisture-curing adhesive to a vehicle roof wherein each vacuum port on the roof stiffener is surrounded by its own adhesive bead so that the outer periphery of each adhesive bead is exposed to the surrounding atmosphere. Such a design allows the adhesive to rapidly cure due to increased exposure to moisture versus conventional methods.

With reference to the figures, a system is provided for adhering a roof stiffener 24 to a roof panel 26 using an adhesive to form a roof assembly 60 for a vehicle.

The roof stiffener 24 is not particularly limited, and may include a wide variety of materials, layers, composites, and components, and may have a wide variety of shapes or forms. The roof stiffener 24 may include a flat, plate-like structure including a first major surface/side 28, an opposite second major surface/side 30, and a perimeter edge 32 connecting the first side 28 and second side 30. The roof stiffener 24 may be a multilayered structure including a lightweight foamboard with a polyurethane foam core and polyethylene-paper cover-sheets. A suitable roof stiffener 24 is KAPA-Term® DVD, available from 3A Composites GmbH, of Switzerland. Other materials, layers, and structures may be used for the roof stiffener 24.

Figure 3:
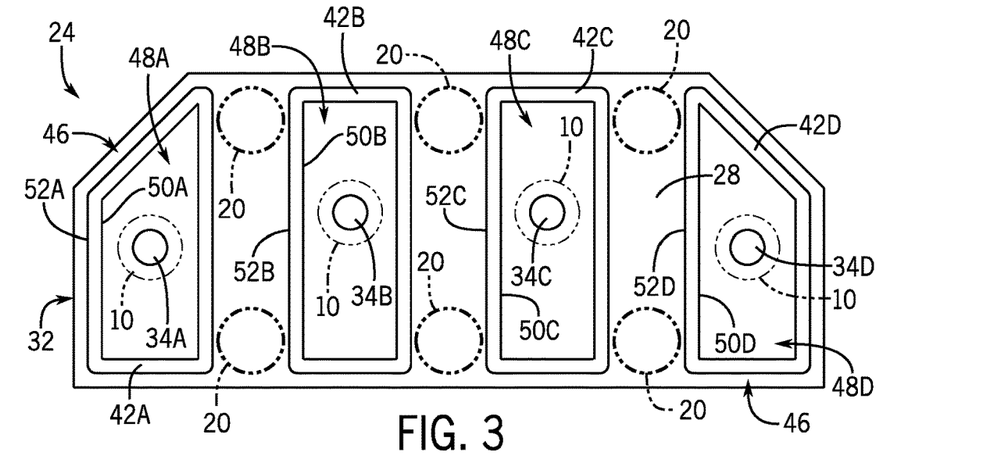
FIG. 3 is a plan view of a roof stiffener according to the present subject matter.
Figure 4:
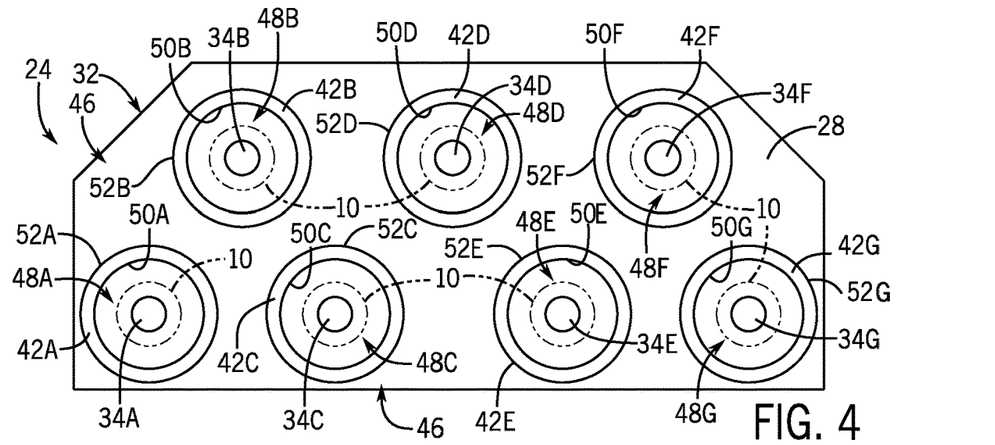
FIG. 4 is a plan view of another roof stiffener according to the present subject matter
Figure 5:
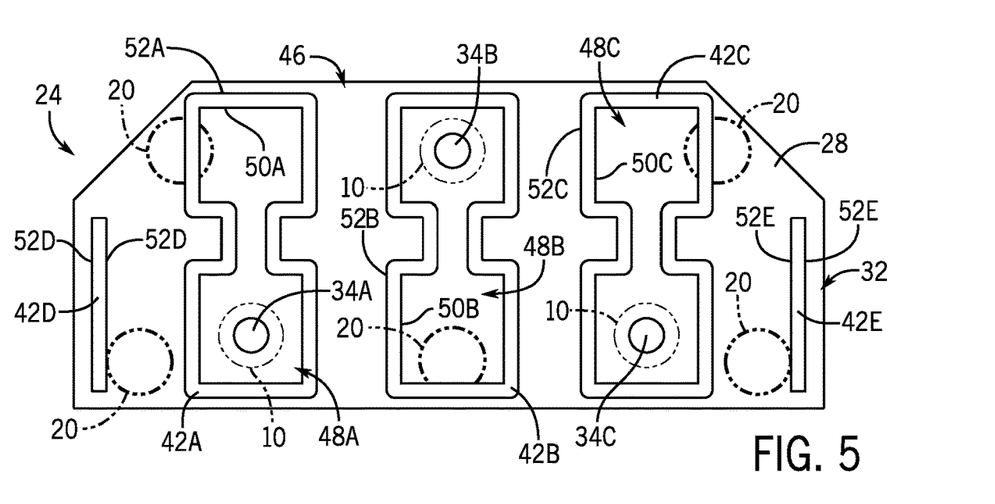
FIG. 5 is a plan view of another roof stiffener according to the present subject matter

The roof stiffener 24 includes at least two vacuum apertures 34 extending through the roof stiffener 24 from the first side 28 to the second side 30. The number of vacuum apertures 34 is not particularly limited, and FIG. 3 depicts the roof stiffener 24 including four vacuum apertures 34A-34D, FIG. 4 depicted the roof stiffener 24 including seven vacuum apertures 34A-34G, and FIG. 5 depicts the roof stiffener 24 including three vacuum apertures 34A-34C. The roof stiffener 24 can include more or less vacuum apertures 34 than that depicted in the figures as long as there are at least two vacuum apertures 34 in the roof stiffener 24.

The roof panel 26 is not particularly limited, and like the roof stiffener 24, may include a wide variety of material, layers, and components, and may have a wide variety of shapes or forms. The roof panel 26 may include a flat, plate-like structure including a first major surface/side 36, an opposite second major surface/side 38, and a perimeter edge 40 connecting the first side 36 and second side 38. The roof panel 26 may define a structural component of a vehicle, such that the second side 38 defines an exterior surface of a roof of the vehicle. The first side 36 may define an interior facing surface of the roof panel 26. The roof panel 26 may include sheet metal. Other material, layers, or components may be included in the roof panel 26.

The roof stiffener 24, after application to the roof panel 26, may be covered by other materials/layers as desired to obscure it from view when used in a vehicle. Such covering material may conceal the vacuum apertures 34 from view.

Figure 6:
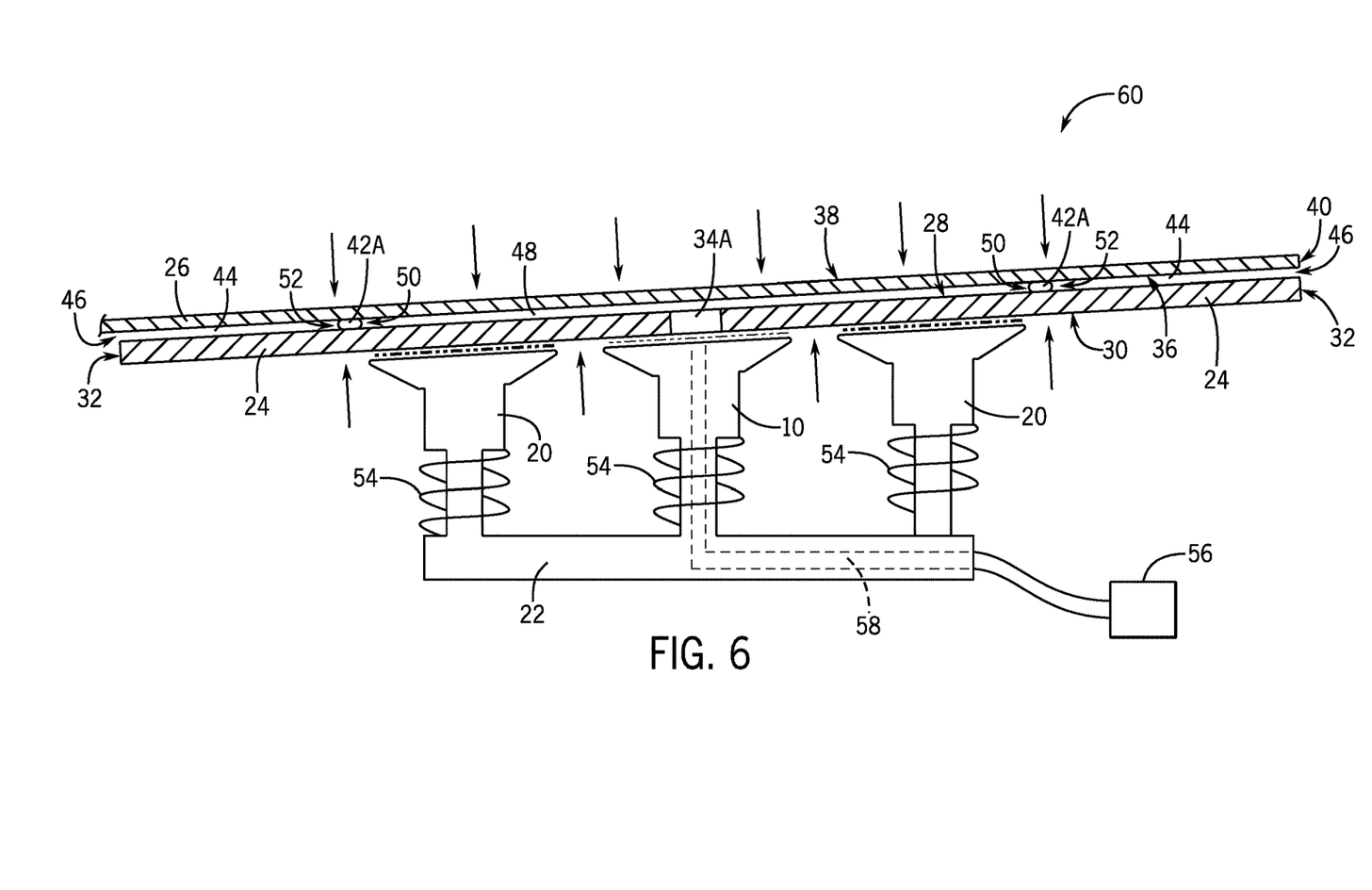
FIG. 6 is side cross-sectional view of a roof assembly and related production method according to the present subject matter.

The roof stiffener 24 may be adhesively bonded to the roof panel 26 as depicted in FIG. 6, optionally in a similar manner and using a similar installation rig as that depicted in FIG. 2. To facilitate such bonding, an adhesive is arranged between the roof stiffener 24 and the roof panel 26, which are brought together to be bonded together by the adhesive.

The adhesive is not particularly limited by the present subject matter, an in a non-limiting embodiment includes a Polyurethane (PUR) reactive adhesives (also called PUR adhesives, reactive hot melts, reactive polyurethanes, or RPU adhesives). PUR reactive adhesives are one-part formulations that combine the initial speed of a hot melt adhesive with the strength of a structural adhesive. The PUR adhesives are applied in a molten state (i.e. as a melted liquid) and form an adhesive bond in two stages. The first stage of bonding produces an initial bonding strength, and occurs when the molten adhesive cools back down from an elevated temperature and solidifies. The solid adhesive provides an initial adhesive bond in a way similar to that produced by solidification of hot melt adhesives. Thereafter, the solidified PUR adhesive is subject to moisture curing by exposure to moisture in the surrounding atmosphere. The moisture curing may proceed over the next 24-48 hours to provide a final adhesive bond. The final adhesive bond strength is usually much greater that the initial adhesive bond strength.

A suitable PUR reactive adhesive is Scotch-Weld™ PUR Adhesives, available from 3M Company, of Maplewood, Minnesota. The adhesive and its application and use in the invention will be discussed herein as though the adhesive includes a PUR reactive adhesive. However, it should be appreciated that the invention can be practiced using other types of adhesives.

The adhesive is arranged between the roof stiffener 24 and the roof panel 26, and may be so arranged by being applied to either the first side 28 of the roof stiffener 24, to the first side 36 of the roof panel 26, or to both. When the roof stiffener 24 and the roof panel 26 are brought together, the adhesive arranged therebetween contacts both the first side 28 of the roof stiffener 24 and the first side 36 of the roof panel 26 and is cured to bind the roof stiffener 24 to the roof panel 26.

Two or more beads of the adhesive (referred to herein as "adhesive beads 42") are arranged between the roof stiffener 24 and the roof panel 26. As used herein, an "adhesive bead" means a singular, continuous, uninterrupted, integral, coherent mass of adhesive that is positioned apart from other masses of adhesive. The mass of adhesive may have any shape including a line, a pool, or other shapes. If one mass of adhesive contacts another mass of adhesive, then the two contacting masses constitute a single adhesive bead.

The adhesive is applied as two or more adhesive beads 42. FIGS. 3-5 depict two or more adhesive beads 42 being arranged on the roof stiffener 24. It should be appreciated that the adhesive beads 42 can, in addition or alternatively, be applied to the roof panel 26, so long as the adhesive beads 42 align to contact the roof stiffener 24 as described for FIGS. 3-5 when the roof stiffener 24 is adhered to the roof panel 26. The present subject matter is not limited to the arrangement of adhesive beads 42 as shown in FIGS. 3-5, and it should be appreciated that the adhesive beads 42 can be applied in different configurations, either to the roof panel 26 or to the roof stiffener 24, than that shown in FIGS. 3-5.

After application to either the roof panel 26 or the roof stiffener 24, the first side 36 of the roof panel 26 is positioned facing the first side 28 of the roof stiffener 24 to define a chamber 44 therebetween. This may be accomplished by moving the first side 28 roof stiffener 24 and the first side 36 of the roof panel 26 together with the adhesive beads 42 between them. When this is done, the roof stiffener 24 and/or the roof panel 26 includes an outer perimeter that defines opening 46 around a perimeter of the chamber 44. As depicted in FIG. 6, the edge 32 of the roof stiffener 24 and the edge 40 of the roof panel 26 do not touch, and thus define the chamber 44 and the perimeter opening 46 of the chamber 44. The perimeter opening 46 may provide fluid communication between the chamber 44 and the surrounding atmosphere, thus allowing moisture to enter into the chamber 44, which can contact the beads 42 and facilitate curing of the adhesive. Such perimeter opening 46 may extend around the entire perimeter edge 32 of the roof stiffener 24 and/or around the entire perimeter edge 40 of the roof panel 26, or parts thereof, which could allow for a significant amount of moisture to enter into the chamber 44 to quickly cure the adhesive beads 42.

Furthermore, the adhesive beads 42, e.g. a first adhesive bead 42A and a second adhesive bead 42B, contact the first side 36 of the roof panel 26 and the first side 28 of the roof stiffener 24. As depicted, the first adhesive bead 42A defines a first continuous perimeter around a first vacuum aperture 34A, and the second adhesive bead 42B defines a second continuous perimeter around a second vacuum aperture 34B. In a non-limiting example, no other adhesive bead is arranged within either of the first and second continuous perimeters. Other adhesive beads 42C-42G can be included as shown in FIGS. 3-6, and these also contact the first side 36 of the roof panel 26 and the first side 28 of the roof stiffener 24. These adhesive beads 42C-42G may also define continuous perimeters around vacuum apertures 34C-34G, although this is not required (See FIG. 5, adhesive beads 42D and 42E, which do not surround a vacuum aperture).

Although the roof panel 26 is not depicted in FIGS. 3-5, it will be appreciated that vacuum chambers 48 may be formed between the roof panel 26 and the depicted roof stiffener 24 by laying the roof panel 26 over the depicted first side 28 of the roof stiffener 24. If this is done, a first vacuum chamber 48A is the three-dimensional space bounded by the first adhesive bead 42A, the roof panel 26, and the roof stiffener 24. A second vacuum chamber 48B is the three-dimensional space bounded by the second adhesive bead 42B, the roof panel 26, and the roof stiffener 24. Other vacuum chambers 48C-48F may be similarly defined as the three-dimensional space between the respective adhesive beads 42C-42F, the roof panel 26, and the roof stiffener 24 as shown. These vacuum chambers 48 are in fluid isolation from the surrounding atmosphere except through the vacuum apertures 34 in the roof stiffener 24.

As previously discussed, the first adhesive bead 42A can be arranged to define the first continuous perimeter around the first vacuum aperture 34A by being applied to the roof stiffener 24, or by being applied to the roof panel 26 and then contacted to the roof stiffener 24 to be arranged in this manner. The second and other adhesive beads can be similarly applied and arranged.

FIG. 3 shows the adhesive beads 42 each having a quadrilateral shape, with the first adhesive bead 42A and the fourth adhesive bead 42D each having a truncated rectangle shape, and the second and third adhesive beads 42B, 42C each having a rectangle shape. FIG. 4 depicts the adhesive beads 42 each having a circle shape. FIG. 5 shows the first, second, and third adhesive beads 42A-42C each have a bubble I-shape, while the fourth and fifth beads 42D-42E are each in the shape of a line. The adhesive beads 42 can all have the same shape (see FIG. 4 in plan view), or can have different shapes (see FIGS. 3, 5 in plan view).

The adhesive beads 42 can have other shapes, including polygon shapes, curved shapes, etc., and can be used so long as the vacuum apertures 34 each have a corresponding adhesive bead 42 that forms a perimeter around the vacuum apertures 34 by contacting the roof panel 26 and the roof stiffener 24 to close off the vacuum chambers 48. Adhesive beads 42 that do not correspond to a vacuum aperture 34 (i.e. do not form a perimeter around a vacuum aperture 34) can have any shape, including a straight line (e.g. adhesive beads 42D and 42E in FIG. 5).

The adhesive beads 42 that correspond with a vacuum aperture 34 (i.e. form a perimeter around the vacuum aperture 34, and along with the roof panel 26 and roof stiffener 24, define the vacuum chambers 48) each have an inner periphery 50 and an outer periphery 52. The inner periphery 50 is in fluid communication with the vacuum chamber 48 (i.e. faces the vacuum chamber 48) and may not be in fluid communication with the surrounding atmosphere, except through the vacuum apertures 34. The outer periphery 52 is in direct fluid communication with the perimeter opening 46, and thus is in direct fluid communication with the surrounding atmosphere. Direct fluid communication with the surrounding atmosphere is accomplished, not through the vacuum apertures 34, but through the perimeter opening 46 in the chamber 44. Thus, the outer periphery 52 may not be in direct fluid communication with the vacuum chamber 48.

The adhesive beads 42 that do not correspond with a vacuum aperture 34 (i.e. adhesive beads 42D, 42E in FIG. 5) do not form a perimeter around a vacuum aperture 34. Each of these adhesive beads 42 may have only an outer periphery 52, and no inner periphery. The outer periphery 52 may be in direct fluid communication with the perimeter opening 46, and thus are in direct fluid communication with the surrounding atmosphere, not through a vacuum aperture 34, but through the perimeter opening 46 in the chamber 44. Thus, the outer periphery 52 may not in direct fluid communication with a vacuum chamber 48.

Because of the described configuration of the adhesive beads 42, each has at least an outer periphery 52 that is at all times in direct fluid communication with the perimeter opening 46, and thus also with the surrounding atmosphere through the perimeter opening 46, and not through the vacuum apertures 34. This may be true even when the vacuum apertures 34 are sealed with a vacuum cup 10 and a vacuum in being created in the vacuum chambers 48. As such, airflow to the adhesive beads 42 is not restricted as it is in the prior art of FIG. 1 for the interior beads 16, which are restricted to air flowing only through the apertures 14 because they are surrounded by the perimeter bead 8. Instead, the present subject matter provides airflow through the perimeter opening 46 and to the outer periphery 52 of each adhesive bead 42, such airflow being uninhibited by a surrounding perimeter bead (e.g. perimeter bead 8 of FIG. 1). Because of this, each adhesive bead 42 is in direct fluid communication with the perimeter opening 46, and thus also with the surrounding atmosphere by air entering into the chamber 44 through the perimeter opening 46 around the entire perimeter edge 40. Such airflow to the outer periphery 52 of each adhesive bead 42 is not restricted by a perimeter bead or by the vacuum apertures 34. This level of fluid communication with the surrounding atmosphere allows elevated levels of moisture to contact the outer periphery 52 of each adhesive bead 42, which moisture can facilitate quick curing of the adhesive beads 42. This is in contrast the prior art of FIG. 1, where only the perimeter bead 8 is in direct fluid communication with air that enters in the chamber through the perimeter opening, while all other interior beads 16 are only in communication with the air entering in through the apertures 14. In other words, the interior beads 16 are interior to the perimeter bead 8, and thus have only limited fluid communication with the surrounding atmosphere only through the apertures 14.

For the adhesive beads 42 that correspond with a vacuum aperture 34, the outer periphery 52 is in direct contact with the surrounding atmosphere through the perimeter opening 46. However, for these adhesive beads 42 that correspond with a vacuum aperture 34, the inner periphery 50 may also be in direct fluid communication with the surrounding atmosphere through the corresponding vacuum aperture 34 after the vacuum cup 10 is removed therefrom, which allows air to enter into the vacuum chamber 48 through the corresponding vacuum apertures 34 to contact the inner periphery 50. Thus, the entire periphery (inner periphery 50 and outer periphery 52) of each adhesive bead 42 may be exposed to moisture in the surrounding atmosphere for these adhesive beads 42. While exposure of air only to the inner periphery 50 may not allow the adhesive beads 42 to cure at a sufficiently fast rate (e.g. due to the restricted flow of air back through the apertures 34 as in the prior art), such limited curing at the inner periphery 50 may nevertheless enhance curing that occurs from exposure of air to the outer periphery 52, and the combined amount of curing at both peripheries 50, 52 may produce curing of the adhesive beads 42 at a sufficiently fast rate.

The adhesive may be applied to either the first side 36 of the roof panel 26 or the first side 28 of the roof stiffener 24 at a desired application amount/rate to give a desired initial bead width and bead height for the adhesive beads 42. Once the adhesive beads 42 are arranged between the first side 36 of the roof panel 26 and the first side 28 of the roof stiffener 24, these are brought together such that the adhesive beads 42 each contact the first side 36 of the roof panel 26 and the first side 28 of the roof stiffener 24 to thereby for the chamber 44 and the vacuum chambers 48 around the vacuum apertures 34.

The roof panel 26 and the roof stiffener 24 may be brought together using the installation rig 22 shown in FIG. 2, using another type of installation device, or by hand. The roof panel 26 and the roof stiffener 24 may be brought together to contact and compress the adhesive beads 42 to their nominal bead height, which may be less than the initial bead height. The adhesive may be solidified by cooling to provide an initial level of bonding between the roof panel 26 and the roof stiffener 24. Thereafter, the adhesive beads may be in fluid communication with the surrounding atmosphere, and thus with moisture as discussed herein, to provide a full cure of the adhesive. With full cure of the adhesive, the adhesive beads 42 provide the final adhesive bonding strength between the roof panel 26 and the roof stiffener 24, which is greater than the initial bonding strength.

The adhesive beads 42 may be compressed to their nominal bead height in what is referred to herein as "vacuum-only" compression, where only a vacuum created in the vacuum chambers 48 draws the roof panel 26 and the roof stiffener 24 towards each other by allowing atmospheric pressure to press the roof stiffener 24 and the roof panel 26 together. In other words, no other force, beside the vacuum, is applied to the roof panel 26 or the roof stiffener 24. This vacuum may be created in the vacuum chamber 48 by sealing the vacuum apertures 34 with vacuum cups 10 as shown in FIG. 6, for example, and sucking out air from the vacuum chambers 48 via the vacuum apertures 34 and through the vacuum cups 10 and vacuum lines 58 using a vacuum pump 56.

The adhesive beads 42 may be compressed to their nominal bead height using what is referred to herein as "mechanical-force-only" compression, where only mechanical force is applied to at least one of the roof stiffener 24 and the roof panel 26 to push them together. This may be accomplished using only the hold cups 20 of the installation rig 22 as shown in FIG. 6, for example, wherein the hold cups 20 are used to push the roof stiffener 24 up toward the roof panel 26. The mechanical force may also or alternatively be applied to the roof panel 26.

The adhesive beads 42 may be compressed to their nominal bead height using what is referred to herein as "combined-vacuum-mechanical-force" compression, by both creating a vacuum in the vacuum chambers 48 using the vacuum cups 10 and by applying a mechanical force to the roof stiffener 24 using the hold cups 20.

The vacuum cups 10 and the hold cups 20 may be mounted on the installation rig 22 using springs 54 or other biasing members to provide a desired amount of pressure against the second side 30 of the roof stiffener 24 that allows for downward movement of the cups 10, 20 but otherwise urges them upward toward the roof stiffener 24.

As shown in FIGS. 3 and 5, the systems provides a combined-vacuum-mechanical-force compression, which may include the use of vacuum cups 10 and hold cups 20 to adhere the roof stiffener 24 to the roof panel 26. FIG. 4 depicters a system that provides vacuum-only compression, which uses only vacuum cups 10 and does not use hold cups 20 for adhering the roof stiffener 24 to the roof panel 26. Any of the systems of FIGS. 3-6 could be modified to provide mechanical-force-only compression by not using the vacuum cups 10, or by not operating the vacuum pump 56 to suck out air from the vacuum chambers 48.

The compression of the adhesive beads 42, by vacuum-only, mechanical force-only, or combined-vacuum-mechanical-force compression, may be maintained until the adhesive is hardened to the solid state from the molten state. Before solidification, the molten adhesive may not be able to adhere the roof stiffener 24 to the roof panel 26 without the compression. After solidification, the adhesive provides the initial adhesive bond and thus may be able to adhere the roof stiffener 24 to the roof panel 26 without the compression.

After solidification, the vacuum, mechanical force, or both (i.e. the compression) may be terminated, or it may be maintained. The vacuum may be maintained by keeping the vacuum cups 10 sealed over the vacuum apertures 34, or may be maintained by arranging a seal (not shown) over the vacuum apertures 34, which seal may be kept in place indefinitely or for a limited time.

The initial adhesive bond provided by the solidified adhesive may be tailored to sufficiently hold the roof stiffener 24 and the roof panel 26 in this compressed state, without the aid of the compression, until the adhesive completely cures and provides the final adhesive bond, which is a permanent adhesive bond between the roof stiffener 24 and the roof panel 26.

Since all the adhesive beads 42 are directly exposed to the surrounding atmosphere through at least the perimeter opening 46 in the chamber 44, the complete curing of the adhesive in each of the adhesive beads 42 may occur more quickly than in the prior art methods. As such, the bonded roof stiffener 24 and roof panel 26 may reach performance requirements more quickly than in the prior art.

This process is not limited to the automotive field or to making a roof of a vehicle, and may also be used to adhere any two panels to each other, or to adhere one panel to a structure that is not in the shape of a panel.

Figure 7:
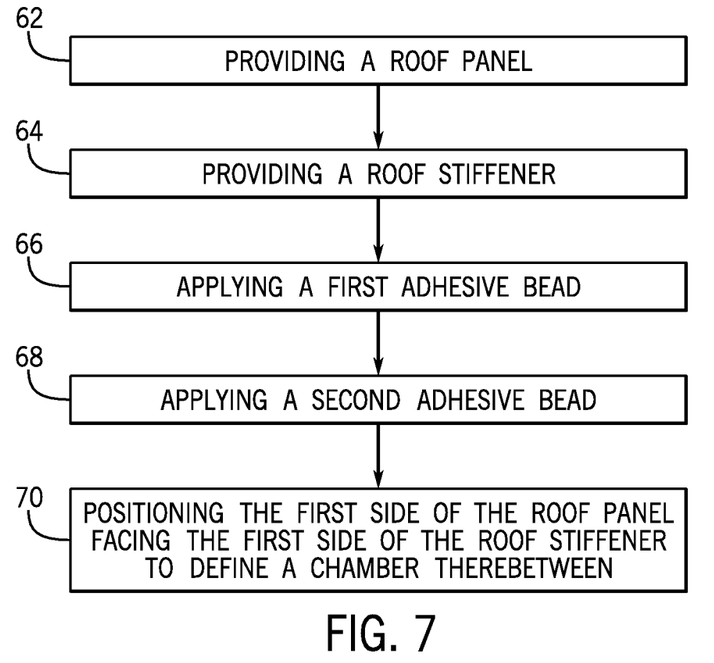
FIG. 7 is a block diagram of a method according to the present subject matter.

With reference to FIG. 7, a method of applying an adhesive to a vehicle roof includes at step 62, providing a roof panel 26 including a first side 36 opposite a second side 38. At step 64, the method includes providing a roof stiffener 24 including a first side 28 opposite a second side 30. The roof stiffener 24 includes at least a first vacuum aperture 34A and a second vacuum aperture 34B each extending through the roof stiffener 24 from the first side 28 of the roof stiffener 24 to the second side 30 of the roof stiffener 24. At step 66, the method includes applying a first adhesive bead 42A to the first side 36 of the roof panel 26 or the first side 28 of the roof stiffener 24. At step 68, the method includes applying a second adhesive bead 42B to the first side 36 of the roof panel 26 or the first side 28 of the roof stiffener 24. At step 70, the method includes positioning the first side 36 of the roof panel 26 facing the first side 28 of the roof stiffener 24 to define a chamber 44 therebetween.

Figure 8:
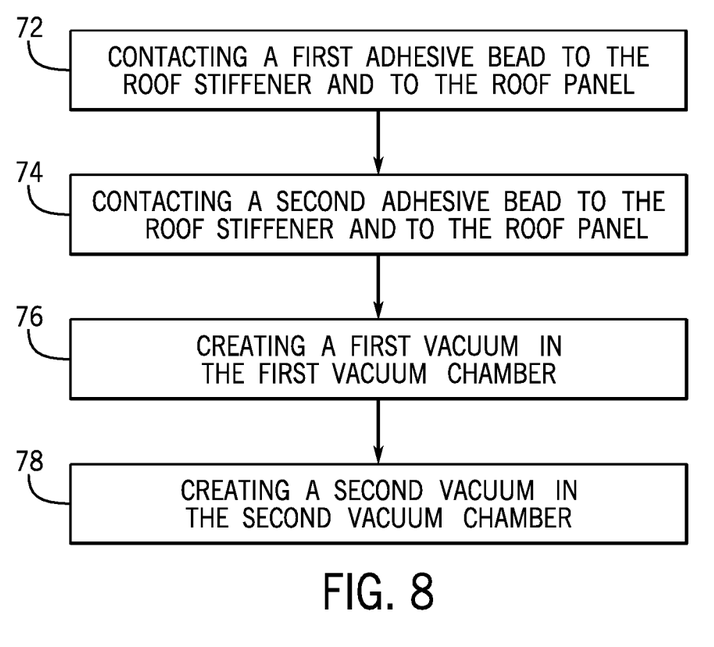
FIG. 8 is a block diagram of another method according to the present subject matter.

With reference to FIG. 8, a method of adhering a roof stiffener 24 to a roof panel 26 includes, at step 72, contacting a first adhesive bead 42A to the roof stiffener 24 and to the roof panel 26 to define a first vacuum chamber 48A, the first vacuum chamber 48A being in fluid isolation from a surrounding atmosphere except through a first vacuum aperture 34A in the roof stiffener 24. At step 74, the method includes contacting a second adhesive bead 42B to the roof stiffener 24 and to the roof panel 26 to define a second vacuum chamber 48B, the second vacuum chamber 48B being in fluid isolation from the surrounding atmosphere except through a second vacuum aperture 34B in the roof stiffener 24. At step 76, the method includes creating a first vacuum in the first vacuum chamber 48A via the first vacuum aperture 34A. At step 78, the method includes creating a second vacuum in the second vacuum chamber 48B via the second vacuum aperture 34B.

A roof assembly 60 for a vehicle may be produced by the above methods, and can include the roof panel 26 adhesively bonded by the adhesive beads 42 to the roof stiffener 24. The perimeter opening 46 may be left unsealed for a sufficient amount of time, such that air from the surrounding atmosphere is able to freely enter the chamber 44 through the perimeter opening 46 and moisture in the air can contact the outer periphery 52 of each adhesive bead 42 to ensure complete curing of the adhesive. The perimeter opening 46 may be left unsealed even after the roof assembly 60 is arranged as part of a vehicle.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of applying an adhesive to a vehicle roof comprising:
   providing a roof panel including a first side opposite a second side;
   providing a roof stiffener including a first side opposite a second side, the roof stiffener including at least a first vacuum aperture and a second vacuum aperture each extending through the roof stiffener from the first side of the roof stiffener to the second side of the roof stiffener;
   applying a first adhesive bead to the first side of the roof panel or the first side of the roof stiffener;
   applying a second adhesive bead to the first side of the roof panel or the first side of the roof stiffener; and
   positioning the first side of the roof panel facing the first side of the roof stiffener to define a chamber therebetween,
   wherein the roof stiffener or the roof panel includes an outer perimeter that defines an opening to the chamber,
   wherein the first adhesive bead and the second adhesive bead contact the roof panel and the roof stiffener, the first adhesive bead defines a first continuous perimeter around the first vacuum aperture, and the second adhesive bead defines a second continuous perimeter around the second vacuum aperture,
   wherein the first adhesive bead includes an inner periphery and an outer periphery and the second adhesive bead includes an inner periphery and an outer periphery, and
   wherein the outer periphery of the first adhesive bead and the outer periphery of the second adhesive bead are in fluid communication with the opening to the chamber.

2. The method according to claim 1, wherein the second adhesive bead does not contact the first adhesive bead.

3. The method according to claim 1, further comprising:
   creating a first vacuum via the first vacuum aperture in a first vacuum chamber between the first continuous perimeter, the first side of the roof stiffener and the first side of the roof panel; and
   creating a second vacuum via the second vacuum aperture in a second vacuum chamber between the second continuous perimeter, the first side of the roof stiffener and the first side of the roof panel.

4. The method according to claim 3, wherein:
   the first vacuum and the second vacuum draw the roof panel and the roof stiffener towards each other and compress the first and second adhesive beads; and
   the first vacuum and the second vacuum are maintained until the first adhesive bead and the second adhesive bead are capable of adhering the roof stiffener to the roof panel.

5. The method according to claim 4, wherein:
   a polyurethane reactive adhesive is used to form the first adhesive bead and the second adhesive bead;
   the polyurethane reactive adhesive is applied in a molten state to form the first adhesive bead and the second adhesive bead; and
   the first vacuum and the second vacuum are maintained until the polyurethane reactive adhesive cools to a solid state.

6. The method according to claim 3, further comprising applying a mechanical force to the roof panel, to the roof stiffener, or to both so as to move the roof panel and the roof stiffener together.

7. The method according to claim 3, wherein once the first and second vacuums are created, no other force is applied to the roof panel or to the roof stiffener to hold the roof panel and the roof stiffener in contact with the first and second adhesive beads.

8. The method according to claim 1, wherein no other adhesive bead is arranged within either of the first and second continuous perimeters.

9. The method according to claim 8, further comprising applying a third adhesive bead to the first side of the roof panel or the first side of the roof stiffener,
wherein the third adhesive bead is separate from the first and second adhesive beads.

10. A method of adhering a roof stiffener to a roof panel comprising:
contacting a first adhesive bead to the roof stiffener and to the roof panel to define a first vacuum chamber, the first vacuum chamber being in fluid isolation from a surrounding atmosphere except through a first vacuum aperture in the roof stiffener;
contacting a second adhesive bead to the roof stiffener and to the roof panel to define a second vacuum chamber, the second vacuum chamber being in fluid isolation from the surrounding atmosphere except through a second vacuum aperture in the roof stiffener;
creating a first vacuum in the first vacuum chamber via the first vacuum aperture; and
creating a second vacuum in the second vacuum chamber via the second vacuum aperture.

11. The method according to claim 10, wherein:
the first and second adhesive beads are applied in a molten state;
the first vacuum and the second vacuum draw the roof panel and the roof stiffener towards each other and compress the first and second adhesive beads;
the first vacuum is maintained until the first adhesive bead solidifies; and
the second vacuum is maintained until the second adhesive bead solidifies.

12. The method according to claim 10, further comprising:
curing the first adhesive bead by exposing an outer periphery of the first adhesive bead to the surrounding atmosphere through a perimeter opening in a chamber defined between the roof stiffener and the roof panel; and
curing the second adhesive bead by exposing an outer periphery of the second adhesive bead to the surrounding atmosphere through the perimeter opening.

13. The method according to claim 10, wherein no other adhesive bead is arranged within either of the first and second vacuum chambers.

14. A vehicle roof assembly comprising:
a roof panel including a first side opposite a second side;
a roof stiffener including a first side opposite a second side, the roof stiffener including a first vacuum aperture and a second vacuum aperture, each of the first and second vacuum apertures extending through the roof stiffener from the first side of the roof stiffener to the second side of the roof stiffener, the first side of the roof stiffener facing the first side of the roof panel to define a chamber therebetween, the roof stiffener or the roof panel including an outer perimeter that defines a first opening to the chamber;
a first adhesive bead contacting the first side of the roof panel and the first side of the roof stiffener, defining a first continuous perimeter on the first side of the roof stiffener around the first vacuum aperture, including an outer periphery that is at least partially in fluid communication with the first opening to the chamber, and including an inner periphery that is in fluid communication with the first vacuum aperture; and
a second adhesive bead contacting the first side of the roof panel and the first side of the roof stiffener, defining a second continuous perimeter on the first side of the roof stiffener around the second vacuum aperture, including an outer periphery that is at least partially in fluid communication with the first opening to the chamber, and including an inner periphery that is in fluid communication with the second aperture.

15. The assembly according to claim 14, wherein:
the first adhesive bead does not contact the second adhesive bead; and
no other adhesive bead is arranged within either of the first and second continuous perimeters.

16. The assembly according to claim 14, further comprising a third adhesive bead separate from the first and second adhesive beads, the third adhesive bead contacting the first side of the roof panel and the first side of the roof stiffener, and the third adhesive bead including an outer periphery that is at least partially in fluid communication with the first opening to the chamber.

17. The assembly according to claim 16, wherein the third adhesive bead does not form a continuous perimeter on the first side of the roof stiffener around a vacuum aperture in the roof stiffener.

18. The assembly according to claim 14, wherein the first and second adhesive beads have the same shape in a plan view.

19. The assembly according to claim 14, wherein the first and second adhesive beads have different shapes in plan view.

20. The assembly according to claim 14, wherein the first and second adhesive beads are formed from a polyurethane reactive adhesive.

* * * * *